(12) United States Patent  
Belknap

(10) Patent No.: US 6,634,616 B2
(45) Date of Patent: Oct. 21, 2003

(54) TWIST LOCK FIXTURE ATTACHMENT SYSTEM

(75) Inventor: Lee J. Belknap, Hendersonville, NC (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 09/728,815

(22) Filed: Dec. 1, 2000

(65) Prior Publication Data

US 2002/0066847 A1 Jun. 6, 2002

(51) Int. Cl.[7] .............................................. F16M 13/00
(52) U.S. Cl. ............... 248/544; 248/222.51; 248/231.9; 362/368
(58) Field of Search ........................... 248/544, 222.52, 248/224.51, 231.99, 343; 362/362, 365, 368, 370, 375, 382

(56) References Cited

U.S. PATENT DOCUMENTS

| | | | | | |
|---|---|---|---|---|---|
| 1,102,079 | A | * | 6/1914 | Rizer | 174/185 |
| 1,182,351 | A | * | 5/1916 | Cochrane | 248/343 |
| 2,012,979 | A | * | 9/1935 | Von Holtz | 439/546 |
| 2,117,761 | A | * | 5/1938 | Douglas | 362/306 |
| 2,243,923 | A | * | 6/1941 | Swanstrom | 439/546 |
| 3,335,471 | A | * | 8/1967 | Seckerson et al. | 24/509.1 |
| 3,511,982 | A | * | 5/1970 | Salter | 362/382 |
| 3,561,719 | A | * | 2/1971 | Grindle | 248/343 |
| 3,885,767 | A | * | 5/1975 | Olowinski et al. | 384/222 |
| 3,919,459 | A | * | 11/1975 | Van Steenhoven | 174/63 |
| 3,986,780 | A | * | 10/1976 | Nivet | 403/353 |
| 4,029,953 | A | * | 6/1977 | Natoli | 362/382 |
| 4,323,215 | A | * | 4/1982 | Berger | 248/544 |
| 4,373,771 | A | * | 2/1983 | Cross et al. | 439/332 |
| 4,388,681 | A | * | 6/1983 | Meyer | 362/374 |
| 4,403,277 | A | * | 9/1983 | Eargle, Jr. et al. | 362/263 |
| 4,653,708 | A | * | 3/1987 | Rich | 248/27.1 |
| 5,056,965 | A | * | 10/1991 | Tsui et al. | 408/72 B |
| 5,407,363 | A | * | 4/1995 | Polgar et al. | 439/546 |
| 5,984,721 | A | * | 11/1999 | Self, Jr. et al. | 439/546 |
| 6,230,440 | B1 | * | 5/2001 | Deutsch | 47/67 |
| 6,520,464 | B1 | * | 2/2003 | Morrissey et al. | 248/222.52 |

OTHER PUBLICATIONS

3 Photos of Die Cast Lighting Fixture With a Hinged Top (Date unknown).
5 Photos of Die Cast Lighting Fixture with Twist Lock Bushing (Date unknown).
4 Photos of Lighting Fixture with Slide on Wiring Compartment (Date unknown).

* cited by examiner

*Primary Examiner*—Kimberly Wood
*Assistant Examiner*—Naschica S. Morrison
(74) *Attorney, Agent, or Firm*—Fay, Sharpe, Fagan, Minnich & McKee, LLP

(57) ABSTRACT

A twist lock attachment system for attaching a fixture having a sheet metal mounting plate that is part of a sheet metal housing to a structural support. The exemplary fixture disclosed is a lighting fixture attached to a wiring conduit. The mounting plate has a generally circular mounting aperture. A twist lock bushing includes a tubular body correspondingly generally circular in cross section. The mounting plate and the twist lock bushing releasably engage each other by relative movement to insert the tubular body into the mounting aperture with the mounting plate and the bushing angularly oriented in an insertion and removal position with reference to each other, followed by rotation of the mounting plate and the twist lock bushing relative to each other to an installed position.

18 Claims, 8 Drawing Sheets

TWIST LOCK FIXTURE ATTACHMENT SYSTEM

BACKGROUND OF THE INVENTION

The invention relates to a twist lock attachment system for attaching a fixture, such as a lighting fixture, to a structural support such as a wiring conduit. The invention particularly applies to lighting fixtures having sheet metal housings.

Fixtures, for example commercial and industrial lighting fixtures, are often installed by hanging from a structural support such as a threaded conduit. A commercial or industrial lighting fixture that includes a ballast transformer can have a substantial weight, making the installation task difficult.

Thus, hanging a heavy, sheet metal housed lighting fixture from a conduit typically requires either extensive bracketry, or expensive permanently-attached threaded bushings. As an example of bracketry, some lighting fixture designs include a relatively small cast plate-like mounting bracket that threads onto the conduit. The heavier, main part of the lighting fixture then slides onto the mounting bracket plate. With permanently-attached bushings, an installer must twist a heavy lighting fixture onto a threaded conduit without damaging the threads or dropping the fixture.

In the case of lighting fixtures that have a die cast housing, in contrast to a sheet metal housing, a current practice is to include a twist lock bushing as part of the housing. Thus, integral hook-like tabs are cast into the housing, and cooperate with a separate locking ring that threads on to the conduit. Twist lock bushings are particularly convenient to use. Mating elements of a twist lock bushing assembly are engaged and then rotated relative to each other a relatively short angular distance, such as 90°, which is far simpler for an installer compared to the multiple rotations required to attach a conventional threaded bushing to a conduit. However, a die cast housing with an integral twist lock bushing element is more expensive than a sheet metal housing.

BRIEF SUMMARY OF THE INVENTION

It is therefore seen to be desirable to provide a twist lock attachment system suitable for use with a fixture, such as a lighting fixture, having a housing made of sheet metal.

In an exemplary embodiment, a twist lock attachment system includes, in general, a mounting plate made of sheet metal included as part of a fixture, as well as a twist lock bushing attachable to a structural support, such as a threaded conduit. The mounting plate has an exterior surface and an opposed interior surface separated by a mounting plate thickness, as well as a generally circular mounting aperture. The twist lock bushing includes a tubular body correspondingly generally circular in cross section, and having an insertion end and an opposite end. The mounting plate and the twist lock bushing releasably engage each other by relative movement to insert the tubular body into the mounting aperture with the mounting plate and the bushing angularly oriented in an insertion and removal position with reference to each other, and subsequent rotation of the mounting plate and the twist lock bushing relative to each other in a first rotational direction to an installed position.

The tubular body more particularly includes a radially-extending top flange located intermediate the opposite end and the insertion end. The top flange has a flange bearing surface axially facing the insertion end for limiting relative axial movement in an insertion direction by bearing against the exterior surface of the mounting plate. The flange bearing surface accordingly defines a flange bearing surface plane. The tubular body additionally includes at least two radially-extending locking tabs intermediate the top flange and the insertion end generally adjacent the insertion end. The locking tabs have locking tab bearing surfaces axially facing the opposite end for retaining the tubular body within the mounting aperture by bearing against the interior surface of the mounting plate in the installed position. Thus, the tab bearing surfaces are separated from the flange bearing surface plane a distance corresponding to the thickness of the mounting plate. For clearing the locking tabs as the tubular body is inserted into or removed from the mounted aperture in the insertion and removal position, the mounting plate has at least two locking tab clearance slots extending radially from the mounting aperture. Releasable elements are provided for preventing relative rotational movement of the mounting plate and the bushing in the installed position.

DETAILED DESCRIPTION OF THE INVENTION

Figure 1:
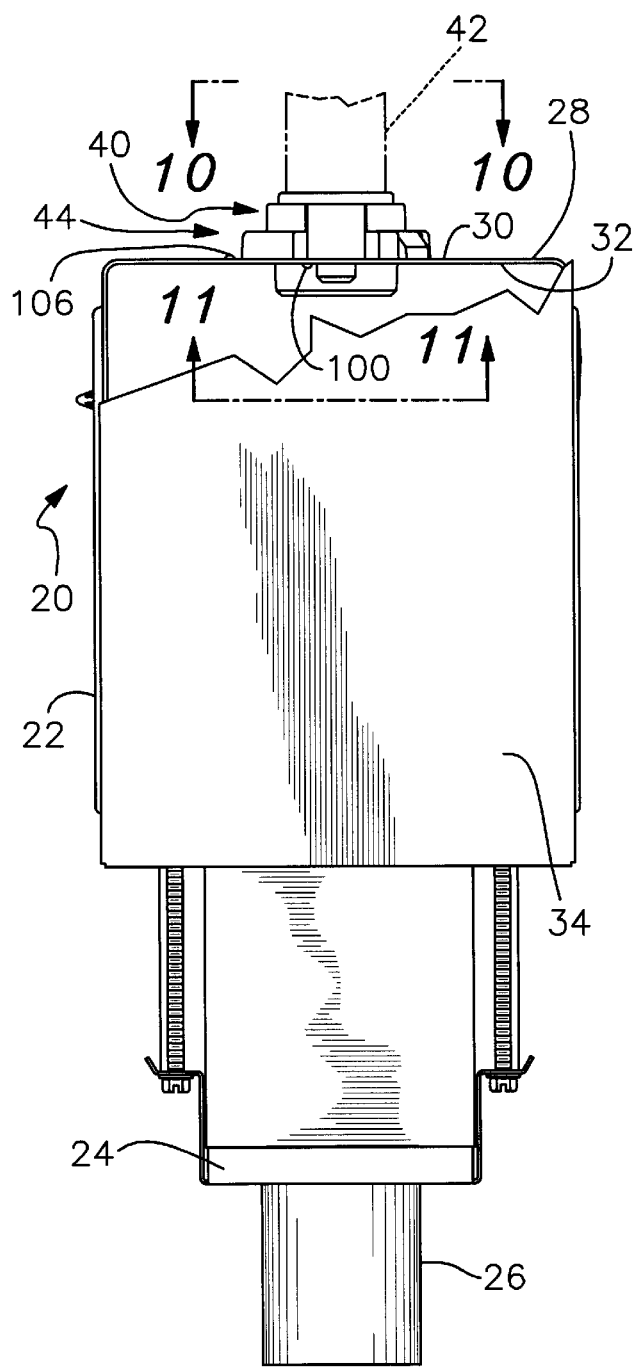
FIG. 1 is a front elevational view, partially broken away, of a fixture embodying the invention.

Referring first to FIG. 1, a representative lighting fixture 20 includes an upper housing 22 made generally of sheet metal, a lower housing 24 containing a relatively heavy ballast transformer, and a socket 26 for a high intensity discharge lamp (not shown). The fixture 20 typically has additional elements, not shown in FIG. 1, such as a reflector and a lens.

The upper housing 22 includes an upper mounting plate 28 made of sheet metal. The mounting plate 28 has an exterior surface 30 and an opposed interior surface 32, separated by a mounting plate thickness. A suitable mounting plate thickness for a fixture weighing 23 pounds (10 kg) is 0.05 inch (1.27 mm). The upper housing 22 also has an end cover 34, which is removable to provide wiring access, as well as an opposite end cover.

Also shown in FIG. 1 is a twist lock bushing 40 which is attachable to a structural support. In the example of FIG. 1, the structural support is a threaded electrical conduit 42, shown in phantom. The threaded electrical conduit 42 may comprise the lower end of a hanger hook (not shown), which includes an aperture for electrical conductors. Twist lock bushings embodying the invention may be provided which are attachable to other forms of structural support, such as directly to beams, or to other ceiling structures, including electrical junction boxes.

The twist lock bushing 40 and the mounting plate 28 together comprise a twist lock attachment system 44.

Figure 2:
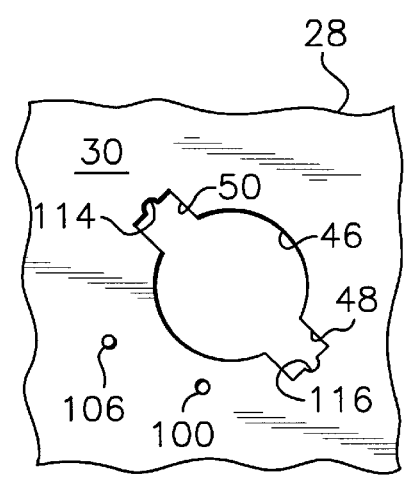
FIG. 2 is a top plan view of a mounting plate included as part of the fixture of FIG. 1.

FIG. 2 is a top plan view of a portion of the mounting plate 28 (generally on line 10—10 of FIG. 1, but with the twist lock bushing 40 not installed). The exterior surface 30 is visible in FIG. 2. The mounting plate 28 has a generally circular mounting aperture 46, with at least two locking tab clearance slots 48 and 50 extending radially from the mounting aperture 46. In the illustrated embodiment, there are a pair of diametrically-opposed locking tab clearance slots 48 and 50.

Figure 3:
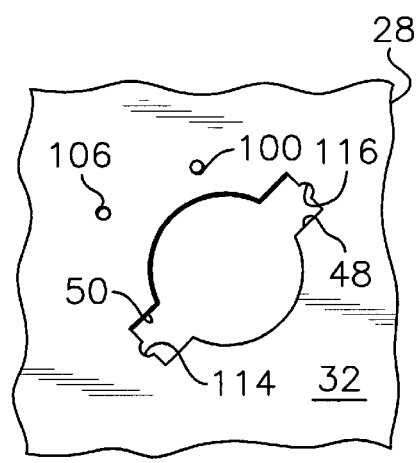
FIG. 3 is a bottom plan view of the mounting plate.

FIG. 3 is a corresponding bottom plan view of the mounting plate 28, with the opposed interior surface 32 visible, as well as the mounting aperture 46, and the locking tab clearance slots 48 and 50.

Figure 4:
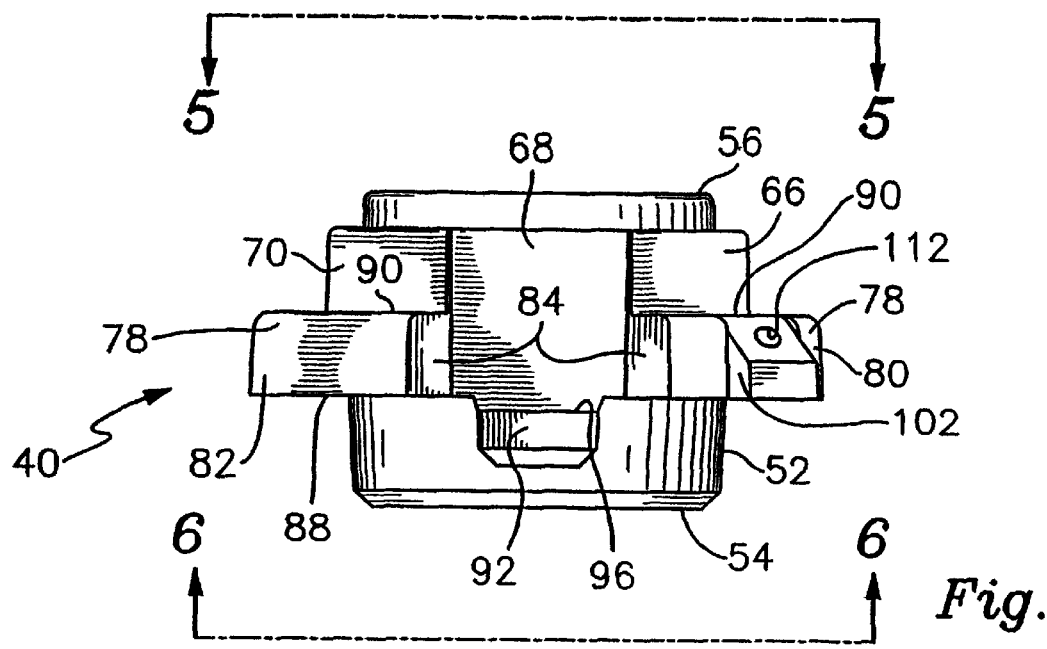
FIG. 4 is a side elevational view of a twist lock bushing in isolation.
Figure 5:
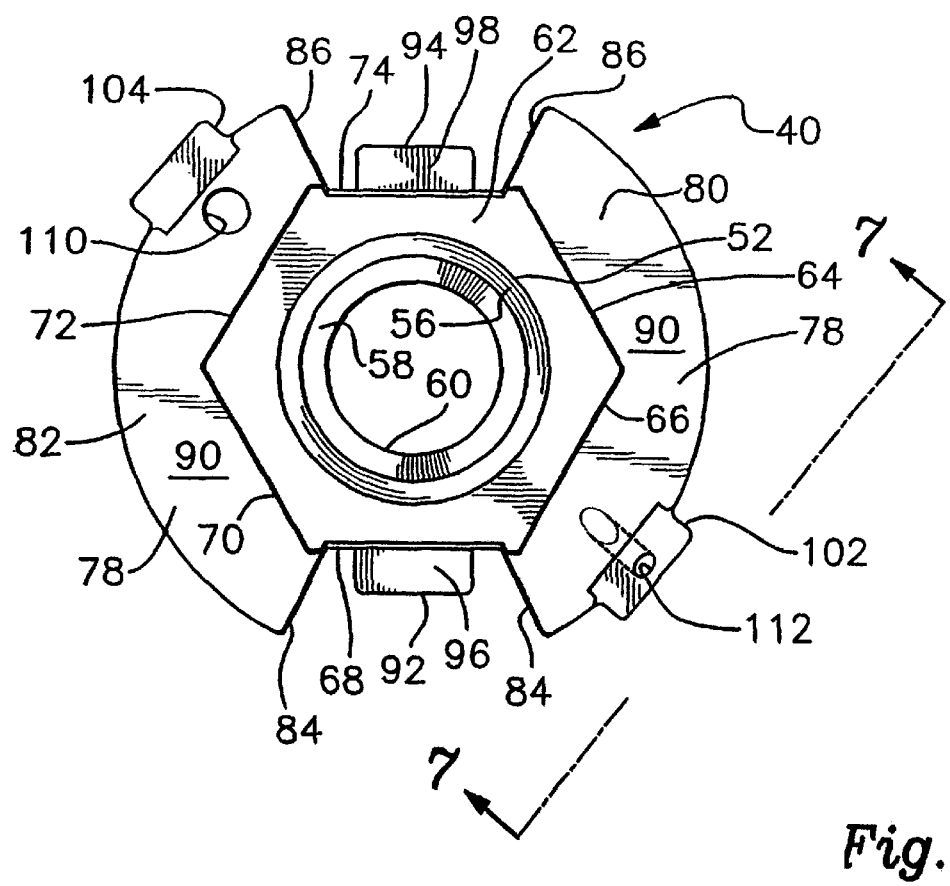
FIG. 5 is a top plan view of the bushing, taken on line 5—5 of FIG. 4.
Figure 6:
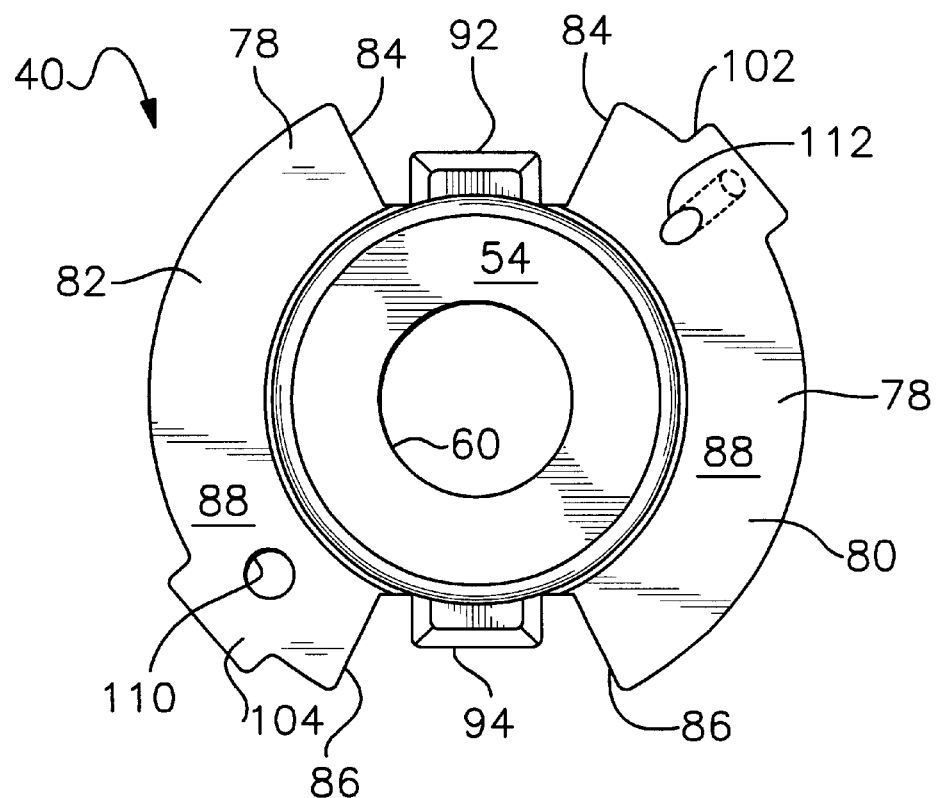
FIG. 6 is a bottom plan view of the bushing, taken on line 6—6 of FIG. 4.
Figure 7:
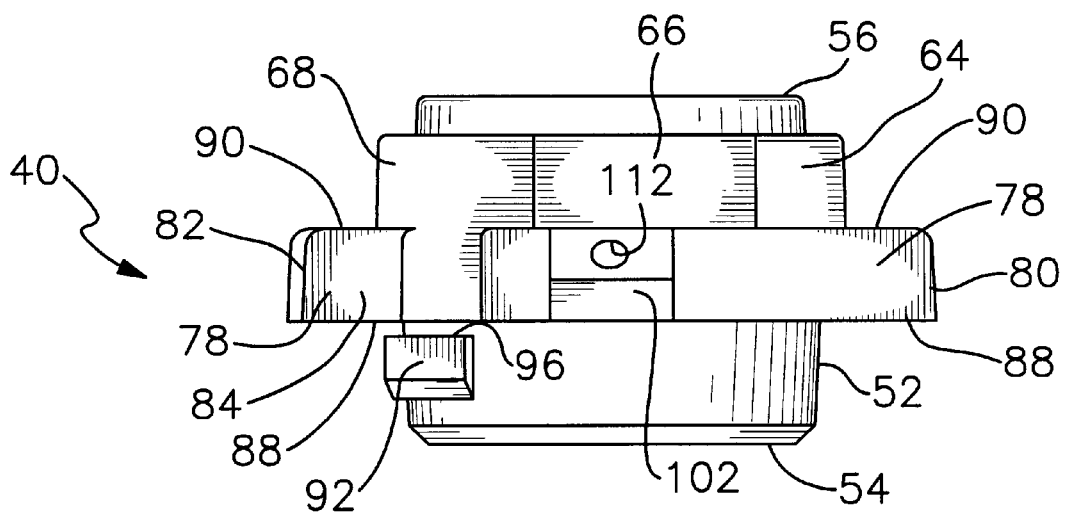
FIG. 7 is a side elevational view of the twist lock bushing in a different orientation compared to FIG. 4, taken on line 7—7 of FIG. 5.

FIGS. 4, 5, 6 and 7 show the twist lock bushing 40 in isolation. In particular, FIG. 4 is a side elevational view in the same orientation as FIG. 1; FIG. 5 is a top plan view taken on line 5—5 of FIG. 4; FIG. 6 is a bottom plan view taken on line 6—6 of FIG. 4; and FIG. 7 is another side elevational view, taken on line 7—7 of FIG. 5. The twist lock bushing 40 has a tubular body 52 which is generally circular in cross-section. The tubular body 52 has an insertion end 54 and an opposite end 56.

Figure 12:
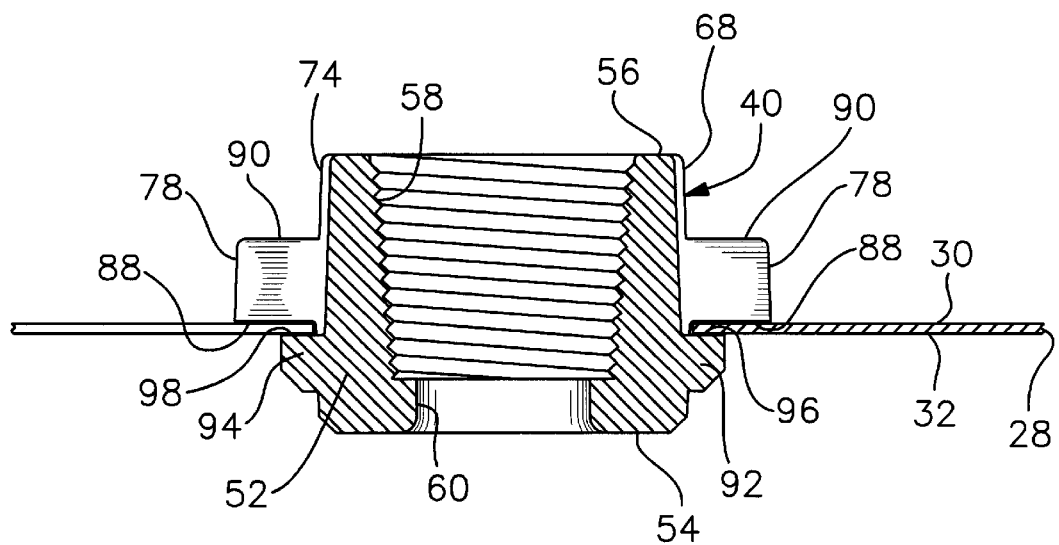
FIG. 12 is an installed-position cross-sectional view taken on line 12—12 of FIG. 10.
Figure 13:
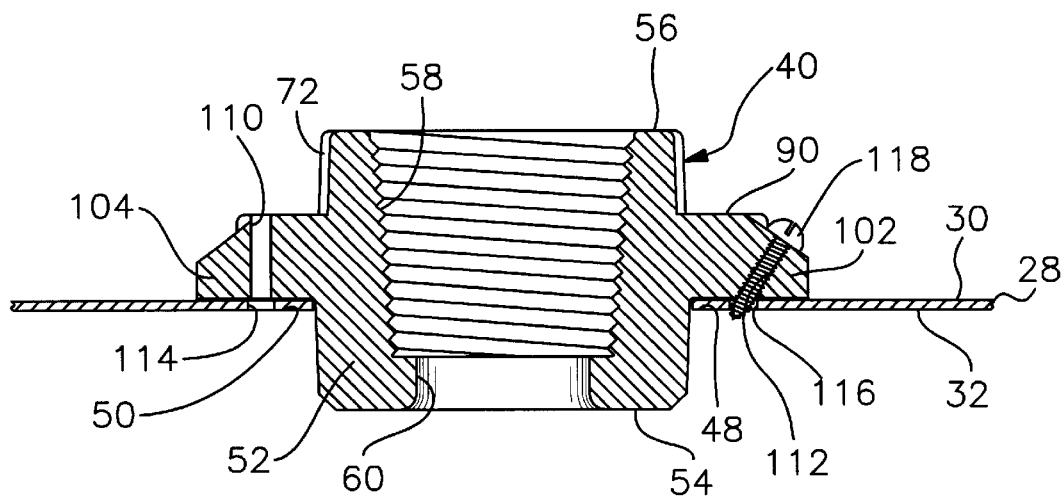
FIG. 13 is an installed-position cross-sectional view taken on line 13—13 of FIG. 10, with a set screw additionally included.
Figure 14:
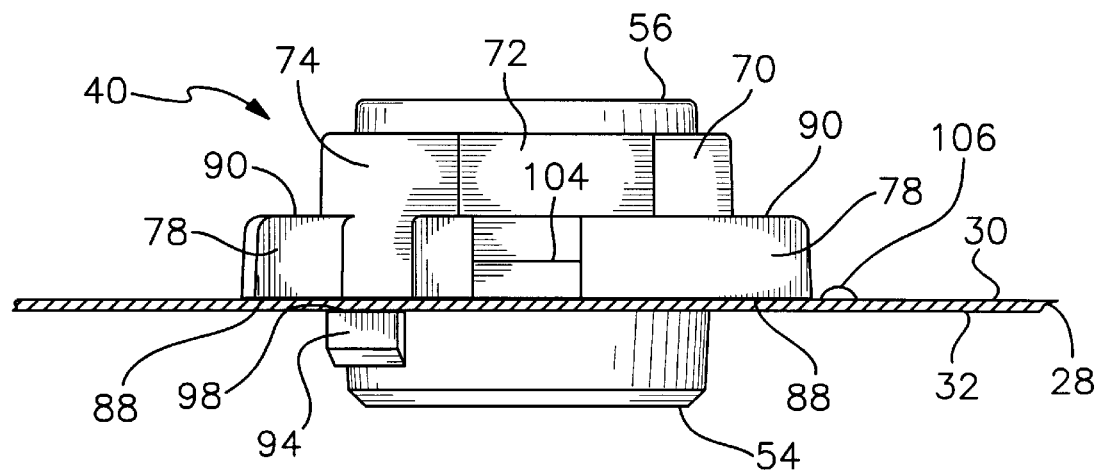
FIG. 14 is a view taken on line 14—14 of FIG. 10.

Referring to the cross-sectional views of FIGS. 12 and 13, in addition to FIGS. 4–7, the tubular body 52 has a tapered bore 58, the interior surface of which is threaded for attachment to a conduit such as the FIG. 1 conduit 42. The interior bore 58 terminates at its lower end in an aperture 60 through which electrical conductors (not shown) pass.

To facilitate threading on to the conduit 42, the bushing 40 tubular body 52 additionally includes an integral hex nut structure 62 having surfaces 64, 66, 68, 70, 72 and 74 engageable by a wrench (not shown), in a conventional manner.

Intermediate the opposite end 56 and the insertion end 54 is a radially-extending top flange 78. In the illustrated embodiment, the top flange 78 comprises a plurality of top flange segments, in particular a pair of top flange segments 80 and 82 separated by annular gaps 84 and 86. The top flange 78 has a lower flange bearing surface 88 axially facing the insertion end 54, and defining a flange bearing surface plane. The flange bearing surface 88 limits relative axial movement in an insertion direction by bearing against the exterior surface 30 of the mounting plate 28. Opposite the flange bearing surface 88 is a flange upper surface 90.

In addition, intermediate the top flange 78 and the insertion end 54 generally adjacent the insertion end 54 are at least two radially-extending locking tabs 92 and 94. The locking tabs 92 and 94 have respective locking tab bearing surfaces 96 and 98 axially facing the opposite end 56 of the tubular body 52. The locking tab bearing surfaces 96 and 98 retain the tubular body 52 within the mounting aperture 46 in the installed position by bearing against the interior surface 32 of the mounting plate 28. The locking tab bearing surfaces 96 and 98 accordingly are spaced from the flange bearing surface plane defined by the lower flange bearing surface 88 a distance corresponding to the thickness of the sheet metal mounting plate 28, including an allowance for parts tolerances. For use in combination with a mounting plate having a maximum thickness of 0.05 inch (1.27 mm), the locking tab bearing surfaces 96 and 98 may be spaced from the plane of the flange bearing surface 88 a minimum distance of 0.05 inch (1.27 mm).

Figure 8:
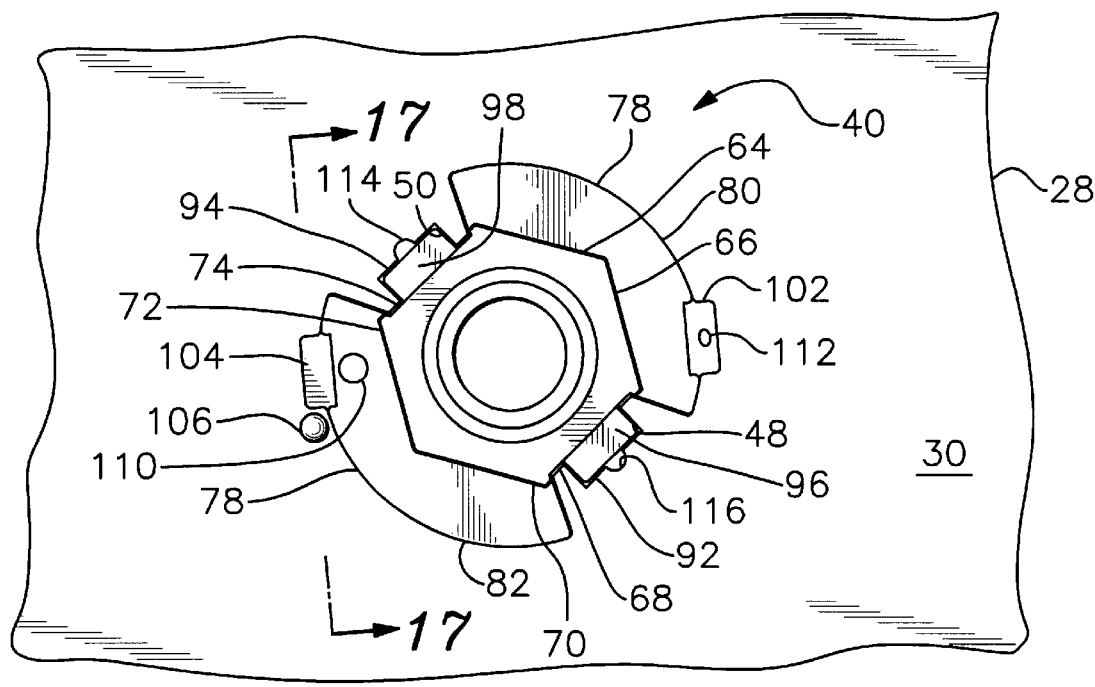
FIG. 8 is an enlarged top plan view, showing the twist lock bushing and a portion of the mounting plate in the insertion and removal position.
Figure 9:
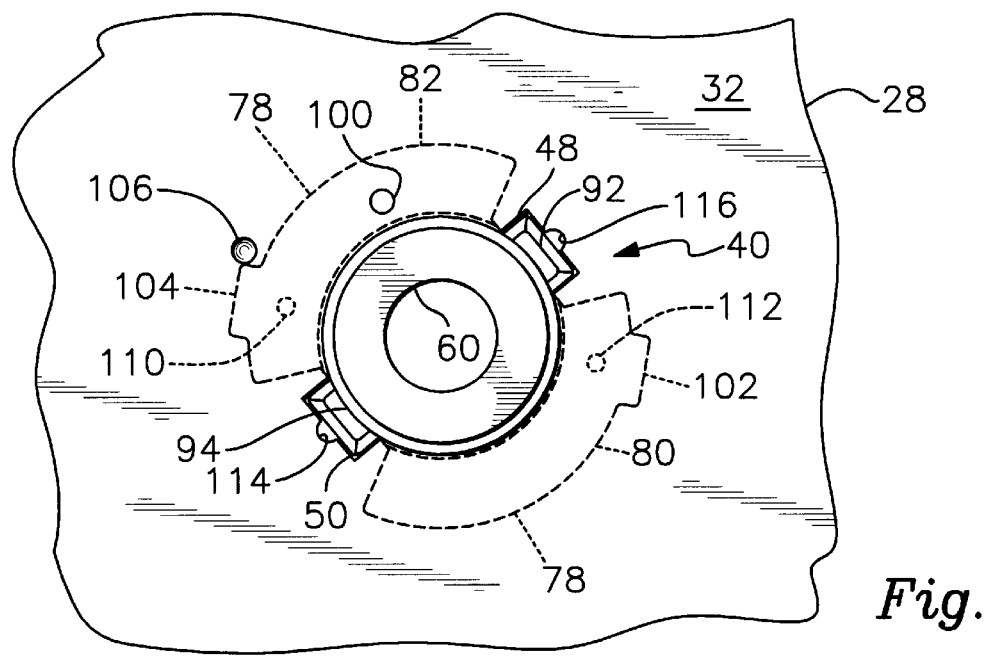
FIG. 9 is an enlarged bottom plan view corresponding to FIG. 8, showing the twist lock bushing and a portion of the mounting plate in the insertion and removal position.

Referring also to FIGS. 8–15, during operation, and referring initially to the top plan view of FIG. 8 and the corresponding bottom plan view of FIG. 9 which show the mounting plate 28 and the bushing 40 in an insertion and removal position, the locking tabs 92 and 94 are cleared by the respective locking tab clearance slots 48 and 50, allowing the twist lock bushing 40 to be inserted into the mounting aperture 46 until the lower flange bearing surface 88 contacts the upper, exterior surface 38 of the mounting plate 28.

Figure 10:
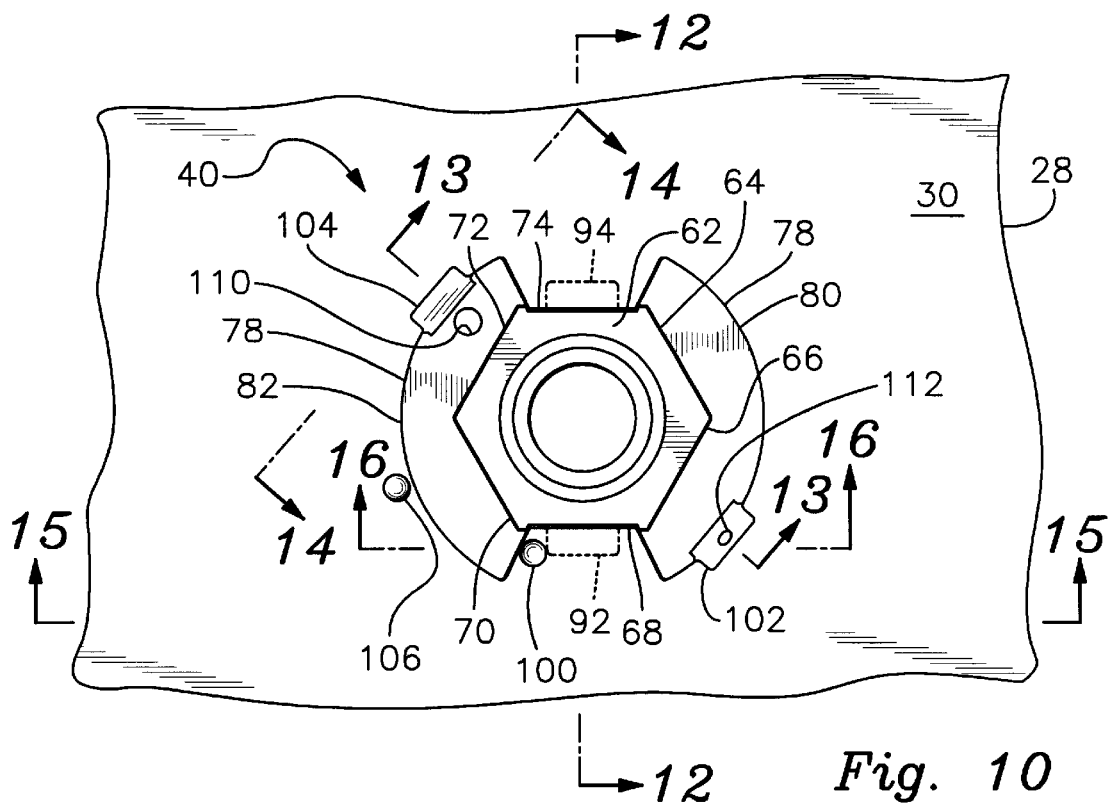
FIG. 10 is an enlarged top plan view, taken on line 10—10 of FIG. I, showing the twist lock bushing and a portion of the mounting plate in the installed position.
Figure 11:
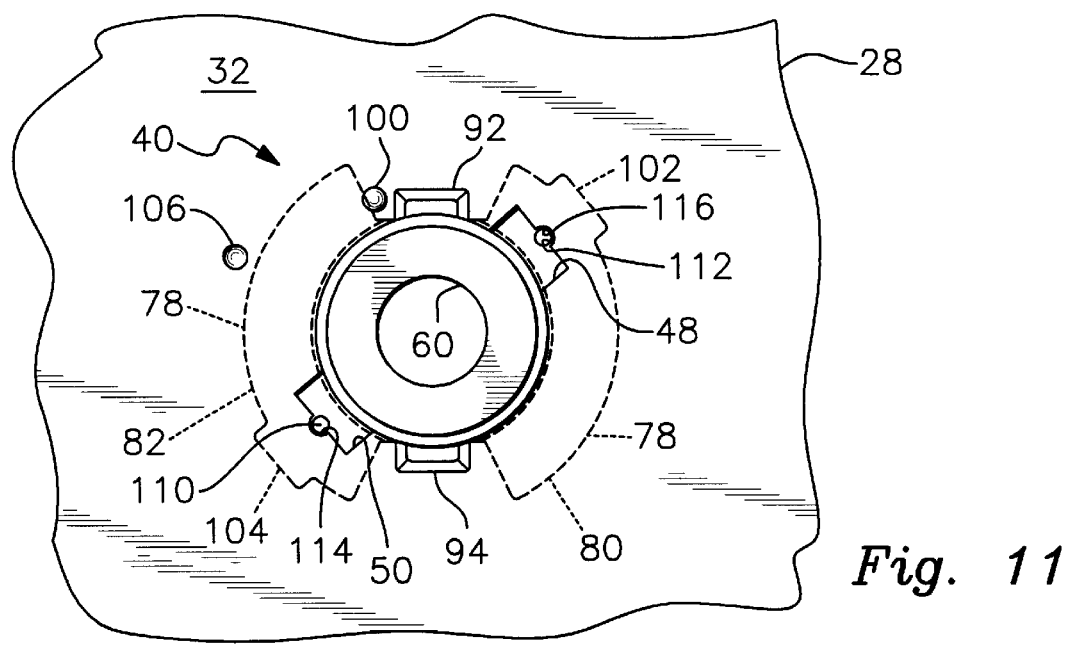
FIG. 11 is an enlarged bottom plan view, taken on line 11—11 of FIG. 1 and corresponding to FIG. 10, showing the twist lock bushing and a portion of the mounting plate in the installed position.

Referring next to the top plan view of FIG. 10 and the corresponding bottom plan view of FIG. 11 which show the mounting plate 28 and the bushing 40 in an installed position, the bushing 40 is rotated in a first rotational direction relative to the sheet metal mounting plate 28 to the installed position of FIGS. 1, 10 and 11. Referring particularly to the cross-sectional view of FIG. 12, in the installed position, the locking tab bearing surfaces 96 and 98 bear against the lower, interior surface 32 of the mounting plate 28, thereby supporting the weight of the fixture 20.

Contrasting FIG. 8 (insertion and removal position) and FIG. 10 (installed position), when viewed from the top, as the first rotational direction the bushing 40 is rotated clockwise relative to the mounting plate 28. In practice, however, the bushing 40 remains stationary, and the mounting plate 28 is rotated counterclockwise to the installed position, when viewed from the top. From the point of view of an installer, when viewed from the bottom as in FIG. 9 (insertion and removal position) and FIG. 11 (installed position), the fixture 20, including the mounting plate 28, is rotated clockwise to the installed position.

To define the installed position by limiting relative rotation of the mounting plate 28 and the bushing 40 in the first rotational direction past the installed position of FIGS. 1, 10 and 11, the mounting plate 28 includes at least one installed position rotational stop 100. The installed position rotational stop 100 extends from either one of the exterior 30 or interior surfaces 32, and is positioned and angularly located so as to contact a portion of the twist lock bushing 40 when the mounting plate 28 and the twist lock bushing 40 are rotated relative to each other in the first rotational direction to the installed position.

Figure 15:
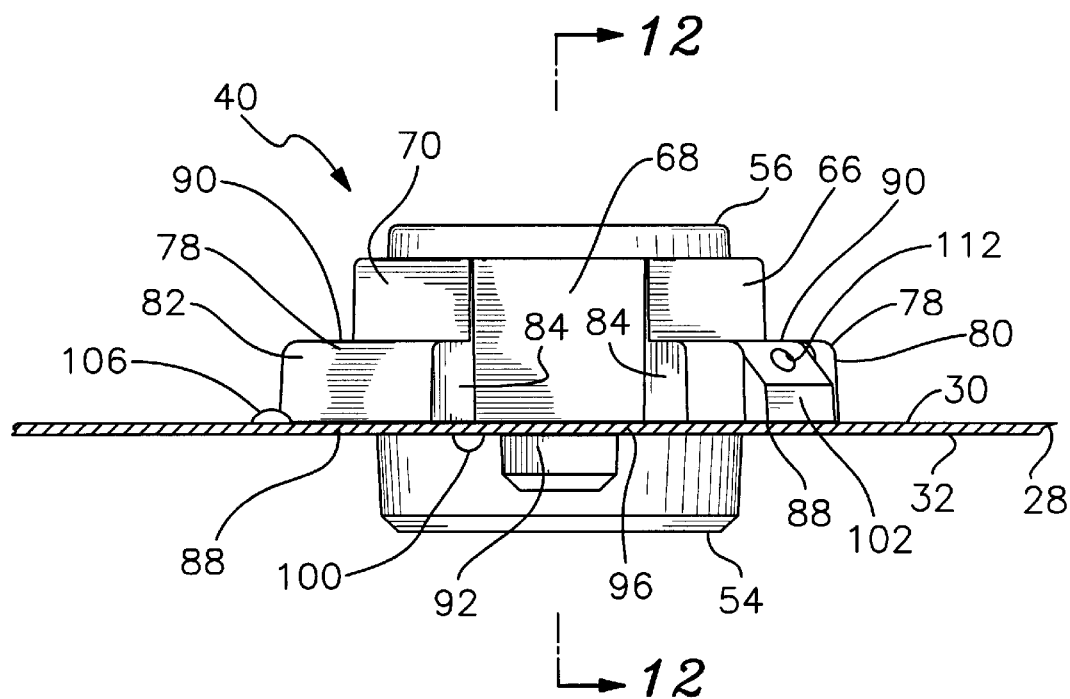
FIG. 15 is a view, in the same orientation of FIG. 1, taken on line 15—15 of FIG. 10.
Figure 16:
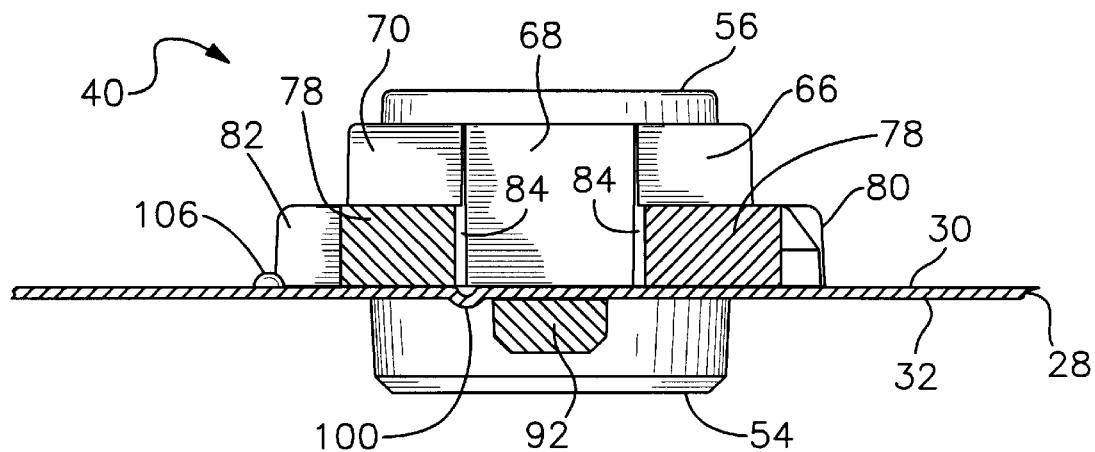
FIG. 16 is a view taken on line 16—16 of FIG. 10.

In the illustrated embodiment, the installed position rotational stop 100 takes the form of at least one interior rotational stop 100 projecting downwardly from the interior surface 32. In FIG. 15, which is a view taken on line 15—15 of FIG. 10, and in FIG. 16, which is a view taken on line 16—16 of FIG. 10 showing the interior rotational stop 100 in cross section, the installed position or interior rotational stop 100 takes the representative form of a "dimple" formed in the sheet metal mounting plate 28, concave when viewed from the top as in FIGS. 2 and 10, and convex when viewed from the bottom as in FIGS. 3 and 11. The installed position or interior rotational stop 100 is positioned and angularly located so as to contact one of the locking tabs 92 and 94 when the mounting plate 28 and the twist lock bushing 40 are rotated relative to each other in the first rotational direction to the installed position. In the illustrated embodiment, the installed position or interior rotational stop in the form of a dimple 100 contacts the locking tab 92 to prevent further relative rotation.

Similarly, to facilitate alignment of the locking tabs 92 and 94 with the locking tab clearance slots 48 and 50 for disengaging the mounting plate 28 and the twist lock bushing 40 in the event the fixture 20 is to be removed, there are provided elements for limiting relative rotation of the mounting plate 28 and the bushing 40 in a second rotational direction opposite the first rotational direction beyond the insertion and removal position of FIGS. 8 and 9. In the illustrated embodiment, the bushing 40 includes at least one rotational stop tab extending further radially from the radially-extending top flange 78. A pair of rotational stop tabs 102 and 104 extend further radially from the top flange 78, the rotational stop tab 102 extending from the top flange segment 80, and the rotational stop tab 104 extending from the top flange segment 82.

Correspondingly, the mounting plate 28 includes at least one exterior rotational stop 106 projecting from the exterior surface 30. The exterior rotational stop 106 is positioned and angularly located so as to contact one of the rotational stop tabs 102 and 104 when the mounting plate 28 and the twist lock bushing 40 are rotated relative to each other in the second rotational direction to the insertion and removal position of FIGS. 8 and 9. From the point of view of an installer, when viewed from the bottom as in FIG. 9, the fixture 20, including the mounting plate 28, is rotated counterclockwise to the insertion and removal position.

Figure 17:
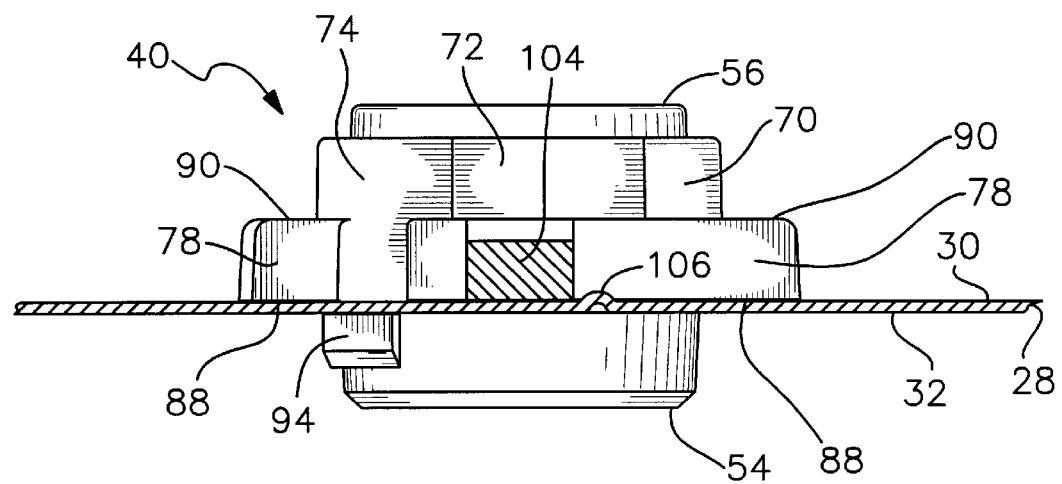
FIG. 17 is a view taken on line 17—17 of FIG. 8.

In FIG. 17, which is a view taken on line 17—17 of FIG. 8, the exterior rotational stop 106 is shown in cross section, and also may be seen to take the representative form of a dimple formed in the sheet metal of the mounting plate 28, in this case projecting upwardly. In the top plan view of FIG. 2, the exterior rotational stop 106 is convex, while in the bottom plan view of FIG. 3, the exterior rotational stop 106 is concave. In the illustrated embodiment, the exterior rotational stop 106 contacts the rotational stop tab 104. The exterior rotational stop 106 is radially spaced from the mounting aperture 46 a sufficient distance to avoid interference with the top flange 78, except for intentional engagement with the rotational stop tab 102 or 104.

Finally, in order to secure the fixture 20 in the installed position, the attachment system additionally includes releasable elements for preventing relative rotational movement of the mounting plate 28 and the bushing 40 in the installed position. A variety of structures may be employed to accomplish this, such as a set screw, latch, spring, bend tab, snap pin, flexible body detent or friction fit.

In the illustrated embodiment, to prevent relative rotational movement of the mounting plate 28 and the bushing 40 in the installed position, the top flange has at least one flange set screw aperture. More particularly, a flange set screw aperture 110 formed perpendicularly through the flange 78 segment 82 angularly co-located with the rotational stop tab 104, as well as another flange set screw aperture 112 angularly co-located with the rotational stop tab 102. For convenience of use, the flange set screw aperture 112 is angled at an angle intermediate 0° and 90° with reference to the flange bearing surface 88 plane. At least a portion of which aperture 112 extends through the exterior rotational stop tab 104.

Correspondingly, the mounting plate 28 has at least one mounting plate set screw aperture, in the illustrated embodiment mounting plate set screw apertures 114 and 116, angularly located with reference to the flange set screw apertures 110 and 112 so as to be in alignment in the installed position so that a set screw 118 (FIG. 13) within the set screw apertures 110 and 114 or 112 and 116 prevents relative rotational movement of the mounting plate 28 and the bushing 40. In the illustrated embodiment, the set screw 118 has self-tapping threads that cut into the sides of angled flange set screw aperture 112. The end of the set screw 118 extends through the mounting plate set screw aperture 116 to provide rotational lock. Alternatively, a set screw could be threaded into the straight set screw aperture 110, extending through the mounting plate set screw aperture 114.

While specific embodiments of the invention have been illustrated and described herein, it is realized that numerous modifications and changes will occur to those skilled in the art. It is therefore to be understood that the appended claims are intended to cover all such modifications and changes as fall within the true spirit and scope of the invention.

What is claimed is:

1. A twist lock attachment system comprising:
a mounting plate made of sheet metal and included as part of a fixture, said mounting plate having an exterior surface and an opposed interior surface separated by a mounting plate thickness, and a generally circular mounting aperture;
a twist lock bushing attachable to a structural support, said twist lock bushing including a tubular body generally circular in cross section having an insertion end and an opposite end;
said mounting plate and said twist lock bushing releasably engaging each other by relative movement to insert said tubular body into said mounting aperture with said mounting plate and said bushing angularly oriented in an insertion and removal position with reference to each other, and subsequent rotation of said mounting plate and said twist lock bushing relative to each other in a first rotational direction to an installed position;
said tubular body including
 a radially-extending top flange located intermediate said opposite end and said insertion end, said top flange having a flange bearing surface axially facing said insertion end for limiting relative axial movement in an insertion direction by bearing against said exterior surface of said mounting plate, said flange bearing surface defining a flange bearing surface plane, and
 at least two radially-extending locking tabs intermediate said top flange and said insertion end and generally adjacent said insertion end, said locking tabs having locking tab bearing surfaces axially facing said opposite end for retaining said tubular body within said installed position by bearing against said interior surface of said mounting plate in the installed position, said locking tab bearing surfaces being spaced from the flange bearing surface plane a distance corresponding to the thickness of said mounting plate;

said mounting plate having at least two locking tab clearance slots extending radially from said mounting aperture for clearing said locking tabs as said tubular body is inserted into or removed from said mounting aperture in the insertion and removal position;

said top flange having at least one flange set screw aperture and said mounting plate having at least one mounting plate set screw aperture, said flange set screw aperture and said mounting plate set screw aperture being angularly located with reference to each other so as to be in alignment in the installed position so that a set screw within said set screw apertures prevents relative rotational movement of said mounting plate and said bushing, wherein said at least one mounting plate set screw aperture comprises a further radial extension of at least one of said locking tab clearance slots; and releasable elements for preventing relative rotational movement of said mounting plate and said bushing in the installed position.

2. The attachment system of claim 1, which further comprises elements for limiting relative rotation of said mounting plate and said bushing in the first rotational direction past the installed position.

3. The attachment system of claim 2, wherein said mounting plate includes at least one installed position rotational stop projecting from one of said exterior and interior surfaces, said at least one installed position rotational stop being positioned and angularly located so as to contact a portion of said twist lock bushing when said mounting plate and said twist lock bushing are rotated relative to each other in the first rotational direction to the installed position.

4. The attachment system of claim 2, wherein said mounting plate includes at least one interior rotational stop projecting from said interior surface, said interior rotational stop being positioned and angularly located so as to contact one of said locking tabs when said mounting plate and said twist lock bushing are rotated relative to each other in the first rotational direction to the installed position.

5. The attachment system of claim 1, which further comprises elements for limiting relative rotation of said mounting plate and said bushing in a second rotational direction opposite the first rotational direction beyond the insertion and removal position to facilitate alignment of said locking tabs with said locking tab clearance slots for disengaging said mounting plate and said twist lock bushing.

6. The attachment system of claim 5, wherein said mounting plate includes at least one insertion and removal position rotational stop projecting from one of said exterior and interior surfaces, said at least one insertion and removal position rotational stop being positioned and angularly located so as to contact a portion of said twist lock bushing when said mounting plate and said twist lock bushing are rotated relative to each other in the second rotational direction to the insertion and removal position.

7. The attachment system of claim 5, wherein:

said bushing includes at least one rotational stop tab extending further radially from said radially-extending top flange, and wherein said mounting plate includes at least one exterior rotational stop projecting from said exterior surface, said exterior rotational stop being positioned and angularly located so as to contact said rotational stop tab when said mounting plate and said twist lock bushing are rotated relative to each other in the second rotational direction to the insertion and removal position.

8. The attachment system of claim 7, wherein said exterior rotational stop on said mounting plate is radially spaced from said mounting aperture a sufficient distance to avoid interference with said top flange.

9. The attachment system of claim 7, wherein said at least one flange set screw aperture and said at least one exterior rotational stop are angularly co-located.

10. The attachment system of claim 9, wherein said flange set screw aperture extends at right angles to said flange bearing surface plane.

11. The attachment system of claim 9, wherein said flange set screw aperture extends at an angle intermediate 0° and 90° with reference to said flange bearing surface plane.

12. The attachment system of claim 11, wherein at least a portion of said flange set screw aperture extends through said at least one position rotational stop tab.

13. The attachment system of claim 1, wherein said top flange comprises a plurality of top flange segments separated by angular gaps.

14. The attachment system of claim 13, wherein said top flange segments cover said locking tab clearance slots in the installed position.

15. The attachment system of claim 1, wherein said tubular body includes a diametrically-opposed pair of radially-extending locking tabs.

16. The attachment system of claim 1 wherein the mounting plate is of a thickness sufficient to support the fixture which weighs at least 20 pounds.

17. The attachment system of claim 1 wherein the fixture includes a removable end cover, providing access for wiring connections.

18. The attachment system of claim 1 wherein the fixture is designed to contain a ballast transformer.

* * * * *